(12) United States Patent
Dusek

(10) Patent No.: US 6,349,661 B1
(45) Date of Patent: Feb. 26, 2002

(54) BOAT DOCK BUMPER

(76) Inventor: Richard Dusek, 7636 Woodridge Dr., Woodridge, IL (US) 60517

( * ) Notice: Subject to any disclaimer, the term of this patent is extended or adjusted under 35 U.S.C. 154(b) by 0 days.

(21) Appl. No.: 09/677,185

(22) Filed: Oct. 2, 2000

(51) Int. Cl.[7] .............................................. B63B 59/02
(52) U.S. Cl. ...................................................... 114/219
(58) Field of Search ................................ 114/219, 343, 114/364; 405/212, 216

(56) References Cited

U.S. PATENT DOCUMENTS

| | | | | |
|---|---|---|---|---|
| 4,548,151 A | * | 10/1985 | Files et al. | 114/219 |
| 5,007,363 A | * | 4/1991 | James | 114/219 |
| 5,048,446 A | * | 9/1991 | Powell | 114/219 |
| 5,701,837 A | | 12/1997 | Harvey | 114/219 |
| 5,762,016 A | | 6/1998 | Parsons | 114/219 |

* cited by examiner

*Primary Examiner*—Ed Swinehart
(74) *Attorney, Agent, or Firm*—Douglas F. Kimball

(57) ABSTRACT

A bumper piling attachment apparatus is provided for securing a cylindrical boat bumper to a piling of a dock and positioning the bumper between the dock and the moored boat. The apparatus forms a circumcolumnar attachment around a piling and rests on the deck of the dock. A flexible section is fixed between the boat and the dock and contains within the flexible section a cylindrical boat bumper. The cylindrical boat bumper absorbs the shock of the boat as it moves in relation to the dock. The apparatus may be fixed to the piling or easily detached and moved from dock to dock.

11 Claims, 2 Drawing Sheets

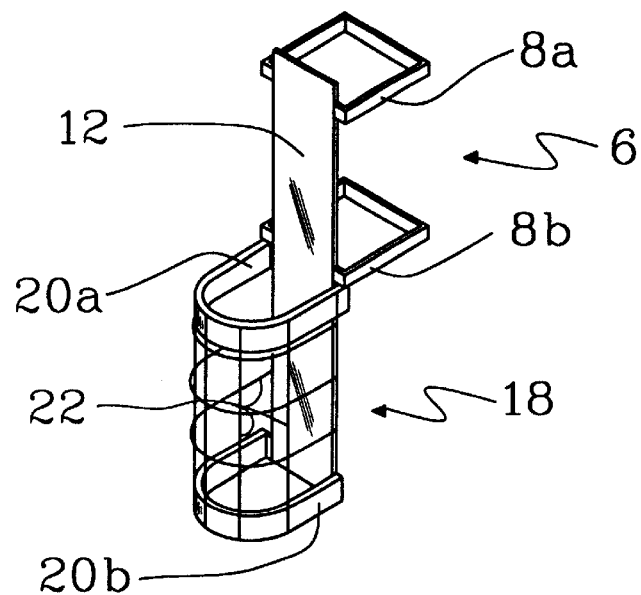
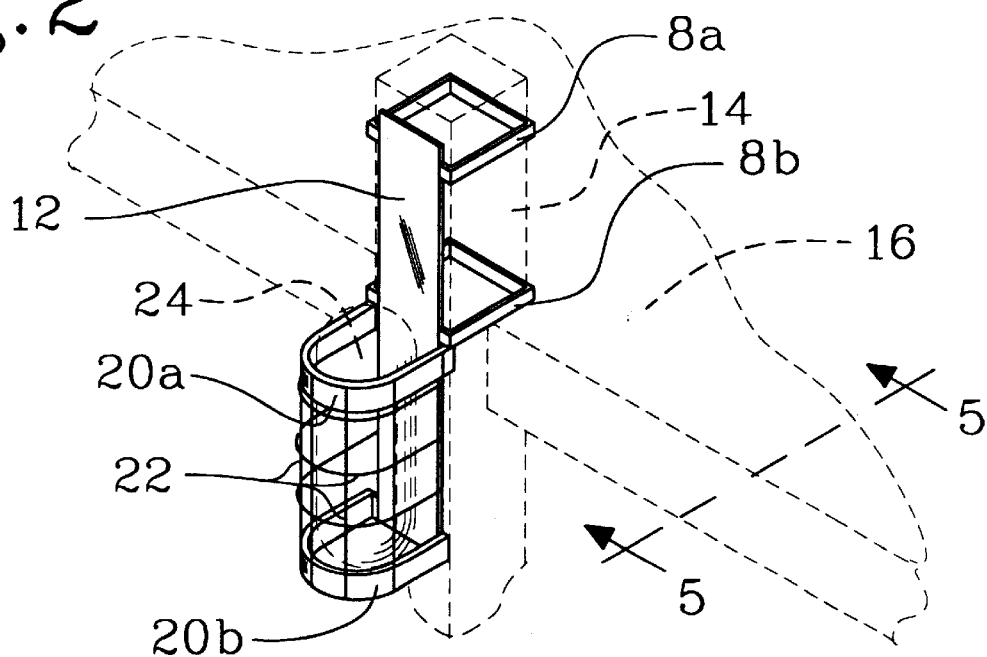

BOAT DOCK BUMPER

BACKGROUND OF THE INVENTION

The present invention relates to the field of boating accessories, and more specifically to field of boat protection from damage when the boat is tied to a dock.

When a boat is secured to a dock, the hull of the boat may contact either the vertical posts (called pilings) of the dock that secure the dock to the lakebed or contact the horizontal planking (the deck) that makes up the surface of the dock on which people walk to gain access to the boat. Docks are constructed with the pilings close together so they are the primary points of contact between the moored boat and the dock. This is so that there will be minimum damage to either the boat or the dock. Because the dock is fixed and stable in the lakebed and the moored boat floats on the surface of the water, any type of wave action, either generated by the wind or by the passing of other boats, will cause the hull of the boat to bounce against the vertical posts of the dock possibly damaging both the dock and the boat. The cost of repairing a wooden dock structure may not be too much but the work is substantial. The cost of repairing damage to an expensive boat may be very expensive and the resale value of the boat will be substantially decreased.

The boat bumper is a device that fits between the boat dock and the moored boat so that neither the boat nor the dock will suffer damage when the moving boat encounters the dock structure. The boat bumper is therefore one of the most important accessories in the rapidly growing recreational boating arena. The protection of the boat and the dock is vital to continued enjoyment of this recreational activity.

Boat bumpers or fenders come in two basic groups. One group attaches to the side or gunwale of the boat. The other attaches to the vertical posts or pilings of the dock. An example of the first type of bumper is the disclosed in U.S. Pat. No. 5,701,837 issued to Thomas E. Harvey in 1997. This fender is fairly rigidly attached to the side or gunwale of the boat and is made of a flexible, deformable material. The material is capable of absorbing the shock of the boat striking the dock. The problem with this type of bumper is that it must be manufactured for each shape of boat gunwale. Additionally, if the boat uses a different dock, the pilings may be at different spacing intervals along length of the dock. Therefore the boat would require a large number of attachment sites for the fender along its gunwale to have proper spacing for the various docks a boat may tie up at.

An example of the type of bumper that attaches to the piling of the dock is disclosed in U.S. Pat. No. 5,762,016 issued to Tom Parsons in 1998. In this Pole Dock Bumper Assembly, a deformable bumper portion is attached to the piling so that it can slide up and down the piling. In this configuration the deformable bumper is always in position to protect the boat and dock. This is very good if the boat owner only ties up at one dock. If the boat needs to be tied up at another dock, such as to refuel, the boat suffers the damage inflicted by that particular dock.

The most common type of boat bumper currently available is a cylindrical, elongated tube, rounded at both ends and made of a resilient deformable material to absorb the bumping of the boat against the dock structure. One end or both ends of the tube have a place to attach a rope so the bumper can be fastened to the boat or the dock. A disadvantage of this type of bumper is that, when the boat pitches or rolls against the bumper due to wave action, the bumper can be easily dislodged from its position between the boat and the dock thus allowing the boat to strike the dock. The advantage of the cylindrical shape is that it is a universal shape that is easily manufactured. When deformed, the cylinder can absorb and dissipate more force than other shapes. If the boater wants to carry the bumpers with her from one dock to another, the rounded shape of the bumper is easy to transport and not dangerous to a person if it should roll around in the boat during the voyage. The cylinder is an excellent shape for a bumper, but the major problem with the cylinder is keeping the bumper in the correct position between the boat and the dock to effectively perform its desired function.

SUMMARY OF THE INVENTION

An object of the invention is to provide a device to secure a cylindrical boat bumper securely between the boat and the dock.

Another object of the invention is to provide a device that can be transported easily from one dock to another. The invention may be permanently attached to the dock or can be easily secured to the dock.

Another object of the invention is to secure the bumper to the dock without the use of ropes. Most boaters would prefer a method of attaching the bumper to the dock in a way that did not require a rope and knots that could become untied resulting in the loss of the bumper. Additionally when the knots become wet from the spray of the waves the knots become hard to untie if the boater decides to leave the dock and take the bumper with him. Quick and easy attachment and detachment to and from the dock would facilitate a mobile boating public.

Another object of the invention is to use the economical, easily available cylindrical bumpers that are currently being manufactured and marketed in a number of sizes.

The boat dock bumper piling attachment apparatus of the present invention consists of a piling engagement section, a coupling element, and a bumper engagement section. The piling engagement section is in a general square shape that is of appropriate size to surround and form a circumcolumnar attachment to the vertical support or piling of the dock. The purpose of the piling engagement section is to easily engage the dock structure so the bumper can be in the proper position to protect the boat. One of the most common pilings for a dock structure for pleasure boating is wooden four by four (4×4). The 4×4 is the piling of choice because it can safely support a dock structure, is easily obtainable, can be treated with preservatives to prevent rot, and can be cut, shaped, and permanently attached to other dimensional lumber. The actual dimensions of the 4×4 cross section are about 3.5 by 3.5 inches. The 4×4 can be cut to an appropriate length with generally available construction tools. The 4×4 piling can be attached to other dimensional lumber by nails, screws and bolts to secure other parts of a dock such as cross pieces or decking to the pilings. Other pilings may be of metal pipe or circular wooden telephone pole-like structure. Appropriately piling engagement sections can be designed to engage those pilings if desired.

Firmly attached to the piling engagement section of the apparatus by a coupling element is the bumper engagement section of the apparatus. The bumper engagement section of the apparatus is flexible cylindrical cage like structure closed across the bottom of the cage. The bumper engagement section must be flexible because the boat will bump against it, and a rigid structure would be crushed and would damage the boat. Into the bumper engagement section of the dock piling attachment apparatus a common cylindrical boat bumper can be inserted. This common cylindrical boat bumper will provide protection for the boat and be secured in place. Held securely within the bumper engagement section, the cylindrical boat bumper will always is perfectly positioned against the piling to protect the boat from damage.

In operation the boat owner will approach the dock and temporarily secure the boat with a rope to the piling. He will then slip the piling engagement section of the bumper piling attachment apparatus over the top of the piling and let it slide down the piling until it stops when it comes to rest on the decking of the dock. He will place additional bumper piling attachment apparatuses to as many pilings as is appropriate for the situation depending on the size of the boat and the exact spacing of the pilings along the length of the dock. He will than insert a common cylindrical boat bumper into each of the bumper engagement sections of the apparatus. He will then secure the boat to the dock by whatever ropes are required by the situation. He can then leave the boat confident it is both secure and protected from damage. If the boater wished to permanently affix the apparatus to the dock, he would perform the same functions as above and then affix the piling engagement section to the piling with screws, adhesive or by any other means appropriate.

Upon returning to the boat, the boater will loosen the ropes attached to the dock. He will then remove the bumpers from the bumper engagement sections and store them on the boat. He will then lift the entire apparatus upward so the piling engagement section will disengage from the piling and store the bumper piling attachment apparatus on the boat. He will then untie all the remaining ropes, enter the boat and proceed to his next destination or activity.

BRIEF DESCRIPTION OF THE DRAWINGS

FIG. 1 is a perspective view of the bumper piling attachment apparatus.

FIG. 2 is a perspective view of the apparatus showing the piling engagement section attached to a dock piling and a cylindrical bumper inserted into the bumper engagement section of the apparatus.

DETAILED DESCRIPTION OF THE PREFERED EMBODIMENT

Figure 3:
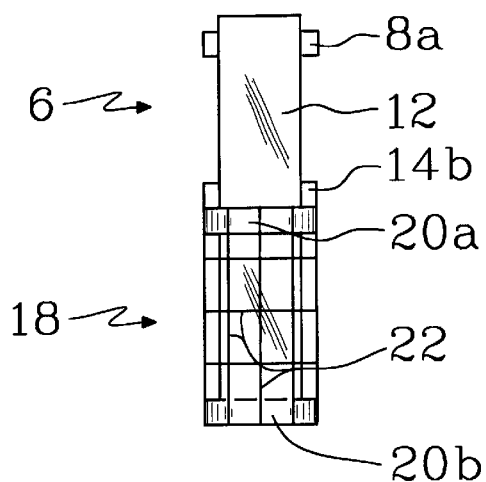
FIG. 3 is a from view of the bumper piling attachment apparatus.
Figure 4:
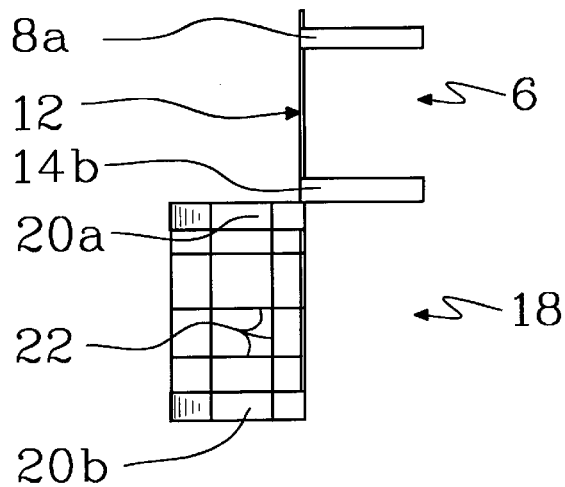
FIG. 4 is a side view of the bumper piling attachment apparatus.

Referring to FIG. 1 the bumper piling attachment apparatus is composed of two major sections, the piling engagement section 6 and the bumper engagement section 18. The piling engagement section 6 is represented here as two square elements 8a and 8b. The piling engagement section is designed to form a circumcolumnar attachment to a vertical piling on a dock. It is important to the functioning of the apparatus that the piling engagement section 6 fit securely on the piling so that the apparatus cannot shift position easily. This is easily understood on the common square pilings. If the boat was to be moored on a dock with round pilings, the piling engagement section, having a different shape than depicted in FIG. 1, might need extra stabilization to keep it from being displaced on the piling. Stabilization might be achieved by wedges inserted between the piling and the piling engagement section or a clamping mechanism that would tighten the piling engagement section after it is in place over the piling. Both these mechanisms would require extra work on the part of the boater and extra expense in the manufacture.

Referring to FIG. 2 the elements of the piling engagement section 8a and 8b form a circumcolumnar attachment to the vertical piling 14 of a dock structure. The lower element 8b rests firmly on the decking 16 of the dock thus fixing the apparatus in place. The piling engagement section should be made of a strong rigid material such as wood, metal, plastic, or fiberglass. Current understanding of the apparatus indicate that fiberglass may be the material of choice for this piling engagement section. FIG. 1 and FIG. 2 show two square bands 8a and 8b as elements of the piling engagement section that form a circumcolumnar attachment to the piling of the dock. Additional elements, such as more bands or cross bracing elements, could be incorporated into the piling engagement section 6 if increased structural rigidity if needed.

FIG. 1 shows the bumper engagement section 18 is attached to the piling engagement section 6 by means of a coupling element 12. As depicted in the drawings, the coupling element 12 is a flat structure running from the top of the piling engagement section 6 to the bottom of the bumper engagement section 18. The purpose of the coupling element is to position the bumper engagement section toward the water side of the dock so it can engage the boat gunwale and protect the boat from damage. The coupling element could be fixed or adjustable. An adjustable coupling element would allow adjustment of the vertical distance of the bumper engagement section from the piling engagement section. Such a mechanism could consist of slots in overlapping pieces of the coupling element and then bolts and nuts to fix it in place when the proper adjustment is determined. Although possibly needed for some applications, the adjustable coupling element is probably not needed for most pleasure boating applications because the relatively consistent height of the docks from the surface of the water and vertical length of the boat bumper. The boat bumper is usually about two to three feet in length so allows for flexibility in the height of the dock. The fixed coupling element would be easier and cheaper to manufacture. Any type of coupling element that can firmly hold the bumper engagement section in the correct spatial relationship to the piling engagement section would be adequate for the invention to accomplish the desired purpose.

The bumper engagement section 18 consists of an upper 20a and a lower 20b flexible retaining element that is attached to the coupling element. Unlike the piling engagement section of the apparatus, the bumper engagement section must be flexible so that when the cylindrical bumper absorbs the shock of the boat hitting it, the section can flex along with the bumper and return to shape to be ready to absorb another shock. The flexible retaining members 20a and 20b could be made of things like flexible plastic tubing or flexible metal banding material. Attached to the flexible retaining members is a flexible netting 22 that retains the cylindrical bumper 24 within the bumper engagement section. The netting can be any cloth netting, but a convenient choice is durable nylon netting.

Figure 5:
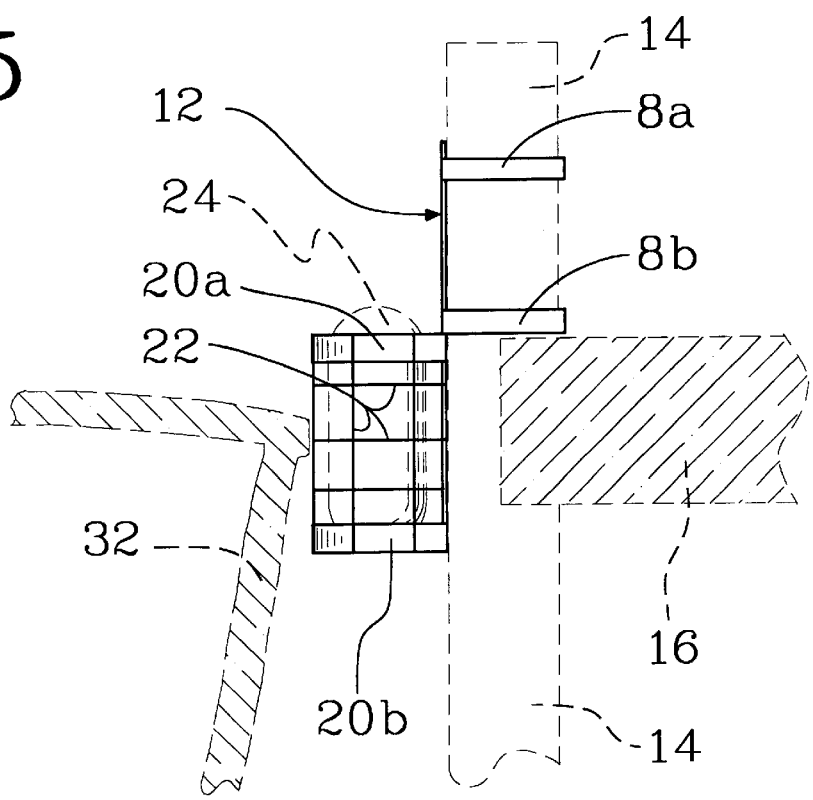
FIG. 5 is a side view of the invention attached to a dock piling with a boat bumper in the bumper engagement section and elements of a moored boat schematically illustrated.

FIG. 5 shows a side view of the complete apparatus attached to a dock piling with the gunwale and side 32 of a boat depicted. This indicates how the cylindrical boat bumper would be positioned between the piling of the dock and the boat.

I claim:

1. A boat dock bumper piling attachment apparatus comprising, a piling engagement section whereby said piling engagement section can form a circumcolumnar attachment around a piling of a dock;

a bumper engagement section having a plurality of flexible retaining members;

a coupling element joining said piling engagement section to said bumper engagement section, whereby, when the piling engagement section is engaging a piling of a dock to form a circumcolumnar attachment around the piling, the piling engagement section rests on a deck of a dock and the bumper engagement section is positioned on the water side of said dock.

2. An apparatus as described in claim 1 wherein the piling engagement device is made of a rigid material.

3. An apparatus as claimed in claim 1 wherein the piling engagement section is made of fiberglass.

4. An apparatus as claimed in claim 1 wherein the piling engagement section is made of wood.

5. An apparatus as claimed in claim 1 wherein the piling engagement section is made of metal.

6. An apparatus as claimed in claim 1 wherein the piling engagement section is made of plastic.

7. An apparatus as claimed in claim 1 wherein the bumper engagement section is made of flexible plastic tubing.

8. An apparatus as claimed in claim 1 wherein the bumper engagement section is made of flexible metal bands.

9. An apparatus as claimed in claim 1 wherein the coupling element fixedly attaches the piling engagement section to the bumper engagement section of the apparatus.

10. An apparatus as claimed in claim 1 wherein the coupling element slideably attaches the bumper engagement section to the piling engagement section of the apparatus.

11. An apparatus for protecting a boat from damage by colliding with a dock when the boat is moored to the dock comprising:

a demountably, deck-engaging circumcolumnar means for attaching the apparatus to a piling of a dock;

a means for securing a cylindrical boat bumper to the apparatus by enclosing the cylindrical boat bumper in a flexible structure;

a means for coupling said means for attaching the apparatus to a piling of a dock and said means for securing a cylindrical boat bumper to the apparatus whereby the cylindrical boat bumper is positioned between the boat and the dock thereby protecting the boat from damage.

* * * * *